United States Patent
Yano et al.

(10) Patent No.: US 7,236,992 B2
(45) Date of Patent: Jun. 26, 2007

(54) STORAGE SYSTEM

(75) Inventors: Masashi Yano, Yokohama (JP); Susumu Matsui, Machida (JP)

(73) Assignee: Hitachi, Ltd., Tokyo (JP)

( * ) Notice: Subject to any disclaimer, the term of this patent is extended or adjusted under 35 U.S.C. 154(b) by 207 days.

(21) Appl. No.: 10/092,662

(22) Filed: Mar. 6, 2002

(65) Prior Publication Data

US 2003/0163457 A1    Aug. 28, 2003

(30) Foreign Application Priority Data

Feb. 28, 2002   (JP)   ............................. 2002-054706

(51) Int. Cl.
   *G06F 17/30*   (2006.01)
(52) U.S. Cl. ................. 707/203; 707/204; 707/202; 707/1
(58) Field of Classification Search ............. 707/203, 707/204, 202, 100, 3, 102, 1, 2, 205, 10
See application file for complete search history.

(56) References Cited

U.S. PATENT DOCUMENTS

| | | | |
|---|---|---|---|
| 6,535,891 B1 * | 3/2003 | Fisher et al. | 707/203 |
| 2002/0052898 A1 * | 5/2002 | Schilit et al. | 707/530 |
| 2002/0087544 A1 * | 7/2002 | Selkirk et al. | 707/10 |
| 2003/0046270 A1 * | 3/2003 | Leung et al. | 707/1 |
| 2003/0110177 A1 * | 6/2003 | Andrei et al. | 707/100 |

OTHER PUBLICATIONS

U.S. Appl. No. 60/339,379, file on ec. 10, 2001. Andrei et al.*

* cited by examiner

*Primary Examiner*—Charles Rones
*Assistant Examiner*—Belix M. Ortiz
(74) *Attorney, Agent, or Firm*—Townsend and Townsend and Crew LLP

(57) ABSTRACT

In order to efficiently use each of storage physical devices fast in access rate for each data block even where a deviation in access frequency exists within a file, in a storage system comprising a plurality of the storage physical devices, a policy is stored within the storage system in advance with respect to the placement of file's data blocks, and data of each file is evaluated with respect to the policy upon storage of the file's data blocks. A decision as to in which storage physical device the corresponding data blocks should be located, is made based on the evaluation result of the policy.

15 Claims, 8 Drawing Sheets

FIG. 2

| | FILE ATTRIBUTE | CONTENTS | CONDITIONS |
|---|---|---|---|
| 204 | NAME OF EXECUTER | NAME OF EXECUTER ID OF ACCESS TO FILE | DESIGNATION, ID, AND ATTACHED GROUP NAME ID COINCIDE ? |
| 205 | HOLDER | FILE'S HOLDER NAME ID | DESIGNATION, ID, ATTACHED GROUP NAME ID COINCIDE ? |
| 206 | SIZE | SIZE OF FILE | SMALLER THAN, SMALLER THAN OR EQUAL TO, LARGER THAN OR EQUAL TO, OR EQUAL TO GIVEN VALUE |
| 207 | CREATION DATE | CREATION DATE OF FILE | NEWER THAN, NEWER THAN OR IDENTICAL TO, OLDER THAN, OLDER THAN OR IDENTICAL TO, OR IDENTICAL TO GIVEN TIME |
| 208 | RENEWAL DATE | FINAL RENEWAL DATE OF FILE | NEWER THAN, NEWER THAN OR IDENTICAL TO, OLDER THAN, OLDER THAN OR IDENTICAL TO, OR IDENTICAL TO GIVEN TIME |
| 209 | FINAL ACCESS DATE | DATE OF FINAL ACCESS TO FILE | NEWER THAN, NEWER THAN OR IDENTICAL TO, OLDER THAN, OLDER THAN OR IDENTICAL TO, OR IDENTICAL TO GIVEN TIME |
| 210 | NAME OF FILE EXTENSION / CREATED AP NAME | TYPE AND CREATION OF FILE / NAME OF USE APPLICATION | EXTENSIONS COINCIDE (WILD CARD DESIGNATABLE) |
| 211 | FREQUENCY OF ACCESS | NUMBER OF ACCESSES TO FILE WITHIN PREDETERMINED PERIOD | SMALLER THAN, SMALLER THAN OR EQUAL TO, LARGER THAN OR EQUAL TO GIVEN VALUE |

| ITEM NUMBER | MEANING | PARAMETER |
|---|---|---|
| 1 | PLACE ALL FILES IN SPECIFIC PHYSICAL DEVICE | NAME OF PLACED STORAGE PHYSICAL DEVICE |
| 2 | SPECIFY HOW MANY BYTES FROM HEAD OF FILE SHOULD BE PLACED IN SPECIFIC PHYSICAL DEVICE | NAME OF PLACED STORAGE PHYSICAL DEVICE, NUMBER OF THRESHOLD BYTES |
| 3 | SPECIFY WHAT PERCENT FROM HEAD OF FILE SHOULD BE PLACED IN SPECIFIC PHYSICAL DEVICE | NAME OF PLACED STORAGE PHYSICAL DEVICE, THRESHOLD PERCENT VALUE |
| 4 | SPECIFY HOW MANY BYTES FROM END OF FILE SHOULD BE PLACED IN SPECIFIC PHYSICAL DEVICE | NAME OF PLACED STORAGE PHYSICAL DEVICE, NUMBER OF THRESHOLD BYTES |
| 5 | SPECIFY WHAT PERCENT FROM END OF FILE SHOULD BE PLACED IN SPECIFIC PHYSICAL DEVICE | NAME OF PLACED STORAGE PHYSICAL DEVICE, THRESHOLD PERCENT VALUE |
| 6 | SPECIFY WHETHER NEWLY-ADDED PORTION SHOULD BE PLACED IN SPECIFIC PHYSICAL DEVICE | NAME OF PLACED STORAGE PHYSICAL DEVICE |

FIG. 4

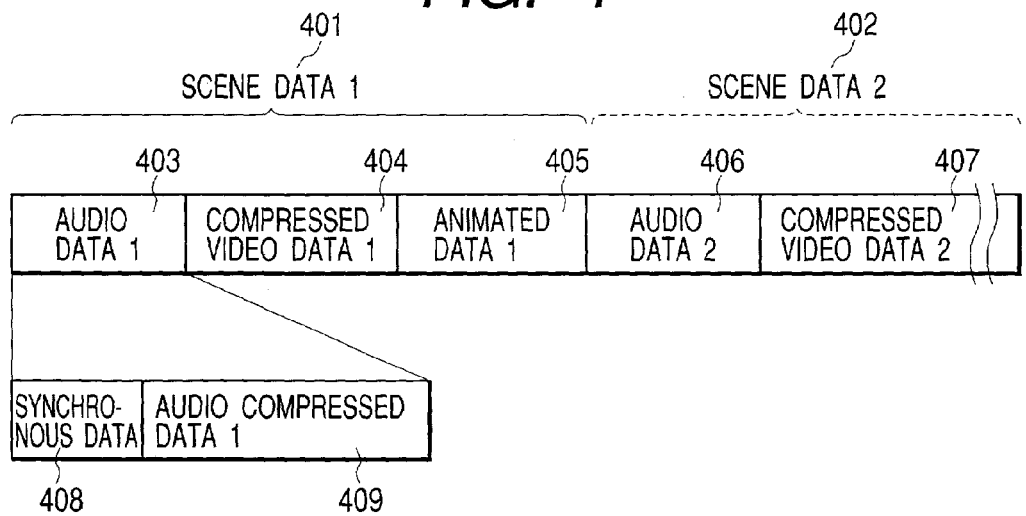

FIG. 5

```
<?xml version="1.0"encoding="Shift_JIS"?> ~501
<!DOCTYPE STORAGE STORED DATA [

<!ELEMENT multimedia-data (file-head, obj-data*)> ~502
                                                                503
    <!ELEMENT file-head (filename, file-ext, size, title?, creator?, bitrate?, time?)>
    <!ELEMENT filename (#PCDATA)> ~504
    <!ELEMENT file-ext (#PCDATA)> ~505
    <!ELEMENT size (#PCDATA)> ~506
    <!ELEMENT title (#PCDATA)> ~507
    <!ELEMENT creator (#PCDATA)> ~508
    <!ELEMENT bitrate (#PCDATA)> ~509
    <!ELEMENT time (#PCDATA)> ~510
                            511
    <!ELEMENT obj-data (obj-head, obj-body)*>             512
    <!ELEMENT obj-head (len, seq, time, dur?, obj-id, command?, bitrate?, encodetype?,
                    mediatype?, content-attribute?)>
    <!ELEMENT len (#PCDATA)> ~513
    <!ELEMENT seq (#PCDATA)> ~514
    <!ELEMENT time (#PCDATA)> ~515
    <!ELEMENT duration (#PCDATA)> ~516
    <!ELEMENT obj-id (#PCDATA)> ~517
    <!ELEMENT command (#PCDATA)> ~518
    <!ELEMENT bitrate (#PCDATA)> ~519
    <!ELEMENT encodetype (#PCDATA)> ~520
    <!ELEMENT mediatype (#PCDATA)> ~521
    <!ELEMENT content-attribute (#PCDATA)> ~522
    <!ELEMENT obj-body EMPTY>
    <!ATTLIST obj-body % media-object-attrs;> ~523
    <!ENTITY % media-object-attrs"
                begin-place CDATA #IMPLIED ~524
                end-place CDATA #IMPLIED ~525
      ">
]>
```

FIG. 6

```
<?xml version="1.0" encoding="Shift_JIS"?>
<!DOCTYPE STORAGE STORED DATA SYSTEM "storagedata.dtd">   ~601
<STORAGE STORED DATA>  ~602
<multimedia-data>
<file-head>
    <filename> movie1.mpg</filename>  ~603
    <file-ext> mpg</file-ext>  ~604
    <size> 2,000,000,000</size>  ~605
    <title> actionmovie</title>  ~606
    <creator> John</creator>  ~607
    <bitrate> 2000000</bitrate>  ~608
    <time> 7200</time>  ~609
</file-head>
<obj-data>  ~610
    <obj-head>  ~611
    <len> 900</len>  ~612
    <seq> 1</seq>  ~613
    <time> 0</time>  ~614
    <dur> 32</dur>  ~615
    <obj-id> 0</obj-id>  ~616
    <command> create</create>  ~617
    <bitrate> 1800000</bitrate>  ~618
    <encodetype> ISO/IEC 14496-2</encodetype>  ~619
    <mediatype> video</mediatype>  ~620
    <content-attribute> promotion commercial</content-attribute>  ~621
    </obj-head>
    <obj-body begin-place="1000" end-place="1064"/>  ~622
</obj-data>
<obj-data>  ~623
    <obj-head>  ~624
    <len> 64</len>  ~625
    <seq> 1</seq>  ~626
    <time> 0</time>  ~627
    <dur> 32</dur>  ~628
    <obj-id> 1</obj-id>  ~629
    <command> create</create>  ~630
    <bitrate> 128000</bitrate>  ~631
    <encodetype> ISO/IEC 14496-3</encodetype>  ~632
    <mediatype> audio</mediatype>  ~633
    </obj-head>
    <obj-body begin-place="1016" end-place="1080"/>  ~634
</obj-data>
         :
</multimedia-data>
</STORAGE STORED DATA>
```

FIG. 7

```
<?xml version="1.0" encoding="Shift_JIS"?>
<xsl:stylesheet xmlns:xsl="http://www.w3.org/TR/WD-xsl">   ~701

<xsl:template match="STORAGE STORED DATA">   ~702
   <xsl:for-each select"/">
      <xsl:if test=".[/obj-data/obj-head/bitrate $ge$ 512000]">   ~703
         <storageselect>
            <phynumber> 1 </phynumber>   ~704
            <filename>
               <xsl:value-of select"/file-head/filename/>   ~705
            </filename>
            <begin-place>
               <xsl:value-of select"/obj-data/obj-body[@begin-place]/>   ~706
            </begin-place>
            <end-place>
               <xsl:value-of select"/obj-data/obj-body[@end-place]/>   ~707
            </end-place>
         <storageselect>
      </xsl:if>
   </xsl:for-each>
</xsl:template>
```

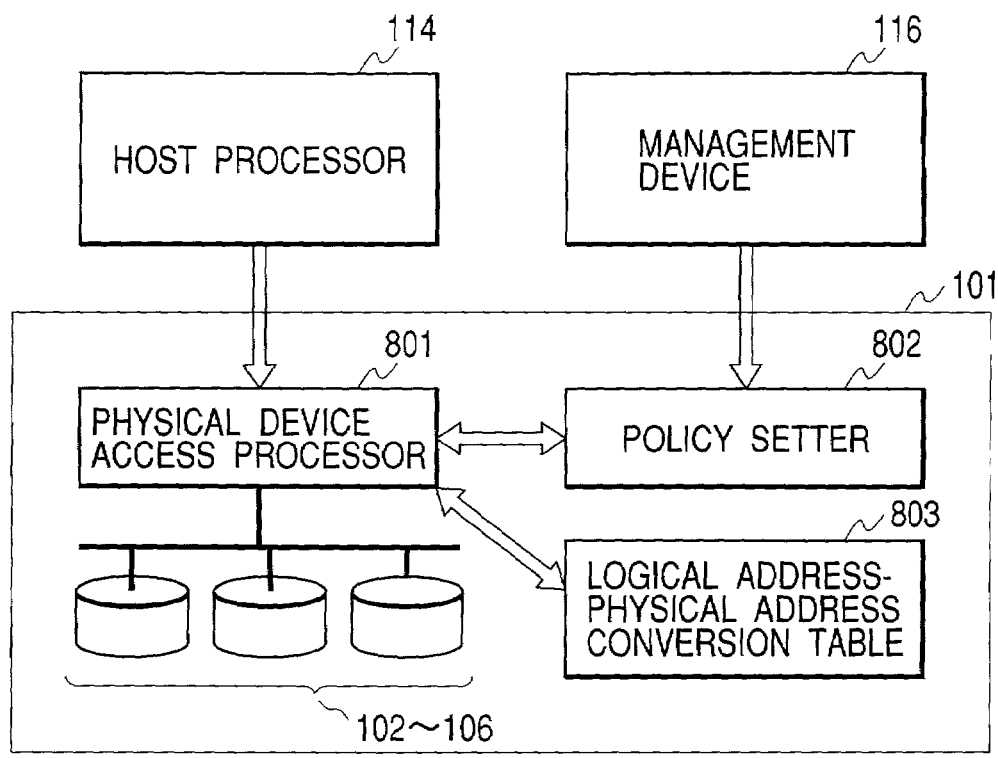

STORAGE SYSTEM

BACKGROUND OF THE INVENTION

The present invention relates to a storage system used in a computer system, and particularly to a storage system wherein the placement of data blocks in a file assigned to within the storage system is improved.

In a current computer system, a disk device is used as a secondary storage system and stores therein data necessary for a host device such as a host processor to execute processing. A storage system grows in increasing demand for a great increase in its capacity as the secondary storage system. A secondary storage system such as a RAID increased in capacity by comprising a plurality of physical devices and a control device for controlling the plurality of physical devices and allowing a host device to recognize them as virtual logic devices has appeared. A plurality of devices constituting such a secondary storage system include a disk unit fast in access rate, a device slow in access rate but large in capacity, etc. Further, a storage system in which those different in access rate are mixed, is now commercially available. In order to enhance an average access rate of the whole storage system, these devices select a storage physical device for storing data blocks according to the frequency of access to a file as viewed from the host device and places the same therein. As to the measurement of the access frequency, the number of times of access to a file within a predetermined time, is measured in file units managed by the host device, for example. A file high in access frequency and a logical volume including the file high in access frequency are placed in a storage system high in access rate.

SUMMARY OF THE INVENTION

Achievement in multimedia of a file attached to an electronic mail, and broad-banding of a network have recently been put forward. The amount of information handled by an intra-company computer system has been brought to a leap upward. Correspondingly, great increases in sizes of a file used for delivery of an image and moving pictures, a file used in a data base, etc. have been put forward. Portions relatively high in access frequency or portions low in access frequency, and the like exist in these files. A deviation in access frequency occurs even in each file. Thus, when the files high in access frequency are placed in their corresponding storage physical devices high in access rate in file units according to the great increases in file sizes while the conventionally-performed placement of data blocks in their corresponding storage physical devices according to access frequencies in file units is being executed, the portions low in access frequency are also placed therein. Therefore, a problem arises in that the storage physical devices high in access performance cannot be used with efficiency.

When an attempt is made to extract only data blocks high in access frequency from a file and locate the same in a storage physical device high in access rate, it is necessary to collect information on access frequency of every data block of physical devices. When an attempt to measure access frequency of every data block is made, the number of data block to be collected becomes enormous with the scale-up of the capacity of each storage physical device. Further, a problem arises in that, with recent enhancement of access rate, a load necessary to collect data on access frequency of every data block of a disk device as a storage physical device, and load on a management device will increase. An object of the present invention is to provide a storage system comprising storage physical devices such as a large number of magnetic disks, wherein only a portion considered to be accessed in high frequency within one file is placed in a disk device high in access rate to thereby realize the transfer of data at high speed between each of host devices and a secondary storage system by using a disk device fast in access rate efficiently.

In order to achieve the above object, the present invention provides a storage system comprising a plurality of storage physical devices, means for controlling access to the plurality of storage physical devices, interfaces respectively provided between host devices and the storage physical devices, and converting means for converting a logical address used upon accessing from each of the host devices into information for specifying a storage physical device in the storage system and a physical address for the specified storage physical device, wherein when access based on a logical address is made to the storage system from the host device, the address converting means converts the logical address into a specific storage physical device and a physical address for the storage physical device to thereby perform accessing.

The storage system includes a management interface for connecting a management device for managing the storage system and is provided with means for presetting, through the management device connected via the management interface, a policy for judging which one of the storage physical devices should be selected and accessed when the host device accesses the storage system. Further, when a request for the placement of data is made to the storage system from the host device, the storage system is provided with means for evaluating whether the access matches the predetermined policy. When they match each other, it determines a storage physical device for placing data blocks, based on the result of evaluation and locates it therein. Further, the storage system includes means having information managing the correspondence of the logical address used in accessing from the host device to information for specifying each storage physical device in a storage subsystem and to a physical address for the storage physical device and for changing the correspondence thereof.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 illustrates an example of a condition for a file to which the policy of the present invention is applied;

FIG. 3 depicts an example of a placement rule of data blocks according to the present invention;

FIG. 4 shows an example of a format of object-encoded multimedia data;

FIG. 5 illustrates an example of an XML type definition of a data structure of an object-encoded file;

FIG. 6 depicts an XML instance of a data structure of an object-encoded file;

FIG. 7 illustrates an XML indicative of an example descriptive of a policy applied to the XML instance of the data structure of the object-encoded file;

FIG. 8 shows an example of a logic structure of a storage sub-system to which the present invention is applied;

FIG. 9 depicts an example of a configuration of a logical address-physical address conversion table to which the present invention is applied.

DETAILED DESCRIPTION OF THE PREFERRED EMBODIMENTS

Preferred embodiments of the present invention will hereinafter be described in detail with reference to the accompanying drawings.

Figure 1:
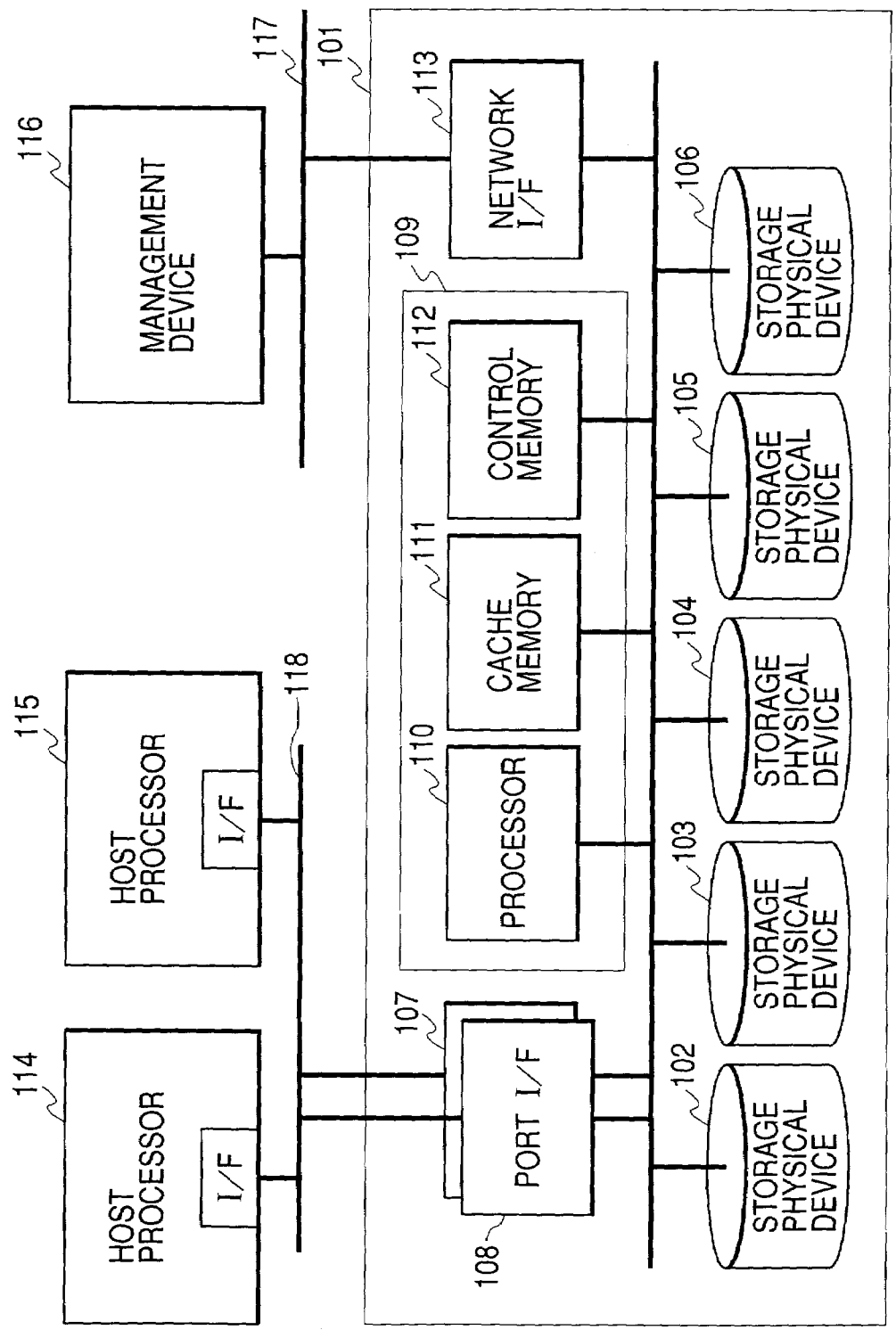
FIG. 1 shows an example of a configuration of a storage system to which the present invention is applied.

One embodiment of a storage system to which the present invention is applied, will be described below using the drawings. FIG. 1 is a schematic block diagram showing an example of a configuration of a storage system to which the present invention is applied. Reference numeral 101 indicates a storage sub-system to which the present invention is applied, reference numerals 114 and 115 indicate host devices such as host processors, which execute various processes by using the sub-system 101 as a secondary storage system, reference numeral 116 indicates a management device which is used to maintain or operation-manage the storage sub-system 101, respectively. The storage sub-system 101 includes storage physical devices 102 through 106 such as a plurality of disk devices or the like. The storage physical devices may comprise ones different in access rate from one another. Reference numerals 107 and 108 indicate port interfaces which provide interface 118 with one or plural upper or host devices. They are connected to their corresponding host devices through a network such as an SCSI (Small Computer System Interface), a LAN (Local Area Network) or a SAN (Storage Area Network) or the like. Reference numeral 109 indicates a disk controller, and reference numeral 113 indicates a network interface which is used for connection to the management device 116 through the LAN 117 or the like.

The storage sub-system 101 seems to be constructed as one or plural storage logical devices obtained by integrating the plurality of physical storage devices 102 through 106 included in the storage sub-system 101 together through the port interfaces 107 and 108 with respect to the host devices such as the host processors 114 and 115 or the like. As the port interfaces 107 and 108, may be employed, for example, an NFS (Network File System) or a CIFS (Common Internet File System) which provides an SCSI-based interface or an interface of a logic file system accessed by a LAN, a SAN connected by a Fiber Channel, etc.

The disk controller 109 is equipped with a processor 110, a cache memory 111, and a control memory 112. The processor 110 performs control on access to a read/write request made from the host devices 114 and 115 such as the host processors, a request process about maintenance and management from the management device 116, and control on the storage physical devices 102 through 106. The cache memory 111 is used as a cache memory which temporarily stores therein data written from each host device to carry out an access process from the host device at high speed, or stores therein data read immediately before. The control memory 112 stores therein programs executed by the processor 110 and stores information for managing the plurality of storage physical devices, and a table for converting logical addresses accessed by the host devices into information for selecting the plurality of storage physical devices 102 through 106 lying within the storage sub-system and into information for physical addresses used in access to the selected storage physical device.

The host devices such as the host processors 114 and 115 make use of the storage sub-system 101 as a secondary storage system through the execution of an operating system or an application program stored in a CPU or a memory. Each of the host devices obtains access to the storage sub-system 101 to thereby read information therefrom or store it therein, thereby implementing a predetermined function.

Reference numeral 116 indicates the management device for managing the storage sub-system 101, which is connected to the network interface 113 of the storage sub-system through the network 117 such as the LAN. The management device 116 performs the collection of statistical information such as use conditions and access frequency of the storage physical devices 102 through 106, and failure supervision on the storage sub-system 101. Further, the management device 116 has the function of setting a policy used for determining in which storage physical devices data blocks should be placed or located, upon storage of the data blocks from the host devices 114 and 115 to the storage sub-system 101.

FIG. 2 shows an example of a condition for a policy for setting which one of storage physical devices 102 through 106 a data block should be stored in. Reference numeral 201 indicates an example illustrative of attributes attached to each file to be stored, reference numeral 202 indicates the contents with respect to the respective attributes of the file, and reference numeral 203 indicates evaluation conditions for each individual attribute, respectively. These conditions will be regarded as policy evaluation conditions utilized in combination. As the attributes, may be mentioned, if an excutable file is given, the name of an executer of the file 204, the name of a holder of the file 205, the size of the file 206, a creation date of the file 207, a renewal date of the file 208, a final access date to the file 209, an extension of the file 210, the frequency of access to the file 211, etc.

FIG. 3 shows an example of a placement rule about how to place or lay out a file which coincides with evaluation conditions in storage physical address. Reference numeral 301 indicates a rule for placing all of files in a specific storage physical device, reference numeral 302 indicates a placement rule for placing the predetermined number of bytes in a specific storage physical device from the head of a file, and reference numeral 303 indicates a placement rule for setting a proportion to be placed in a specific storage physical device from the file head, respectively. Reference numeral 304 indicates a placement rule for placing the predetermined number of bytes in a specific storage physical device from the end of the file, and reference numeral 305 indicates a placement rule for setting a proportion to be placed in a specific storage physical device from the file end, respectively. Reference numeral 306 indicates a placement rule for placing only a newly-placed data block in a specific storage physical device.

A policy set to the storage sub-system 101 from the management device 116 shown in FIG. 1 is intended to place each data block, based on the placement rules of FIG. 3 according to one that matches the condition of FIG. 2 or one that matches a condition obtained by utilizing a plurality of conditions in combination. This policy is stored in the control memory 112 of the storage sub-system 101. When each of the host devices 114 and 115 such as the host processors makes a request for data block placement to the storage sub-system 101, the processor 110 evaluates the policy stored in the control memory 112 lying within the storage sub-system 101 and the placement request and thereby determines a storage physical device to be placed.

As to an example of the policy based on the attributes of each file, when, for example, an extension of a file is of .doc corresponding to a document file, it is located in a storage physical device having 1 as a storage physical device ID. When, for example, an extension of a file for storing data about a received electronic mail is of .dbx, a new mail is stored, and a portion corresponding to 20% of the last half of a file considered to be accessed frequently and a newly-added portion are placed in a storage physical device having 2 as the storage physical device ID.

An example in which data blocks are stored according to the definition of a data structure of a file, will next be shown as another embodiment. FIG. 4 shows an example of a configuration of a file storing a bit stream of object-encoded multimedia data such as MPEG4. The multimedia data comprises data encoded every objects set for every scene that is a set of data for each frame or a set of data reproduced with synchronization. Encoded data which are stored with being added with headers every object data of the respective scenes. Reference numeral 401 indicates a scene 1. The scene 1 comprises an audio object 403, a compressed video object 404, and an animated object 405. A playback or reproducing device performs decoding processes for every these objects and thereafter reproduces the objects in sync with one another. Data 405 through 407 for every objects of a scene subsequent to the scene 401 are stored in a scene 402. Reference numeral 408 indicates a header portion of object data, which stores therein an object 409 corresponding to video data. The header portion includes time stamp information, a sequence number, an identifier shared between data to be synchronized, etc. as synchronous data necessary to be reproduced in sync with the respective objects. Also the header portion might include a specific header which stores a coding system required to reproduce the respective objects, a band necessary for reproduction and communications, etc. When it is desired to provide services such as moving picture delivery using the object-encoded file referred to above, it is considered that data customized every users are transmitted. It is considered at this time that only a necessary portion is selected from the intended object and then transmitted. At this time, a policy is considered that an object which needs a portion accessed by a large number of users or which needs a wide band, is placed in a storage physical device fast in access rate.

A description will be made subsequently of operation when the file having such a data structure as shown in FIG. 4 is stored in the storage system according to the present invention. Prior to the storage of the file of the multimedia data of FIG. 4 in the storage sub-system 101, the management device 116 first sets to the storage sub-system 101, a policy about the definition of the file structure of the multimedia data of FIG. 4 and how to store data upon storage of the data. The set contents of the policy is stored in the control memory 112 of the storage sub-system. When it is desired to store a file structure placed under the data structure from the host devices 114 and 115, the processor 110 collates the policy on the control memory 112 with it upon storage processing to thereby determine in which one of the storage physical devices 102 through 106 it should be stored, followed by being written therein. FIG. 5 shows an example of DTD (Document Type Definition) of an XML (extensible Markup Language). This is an example in which the definition of the data structure of the file having stored the multimedia data of FIG. 4 therein is defined using the XML. Reference numeral 501 indicates a document declaration of the XML. A tag designated at numeral 502 indicates that a file is made up of a file header and object data set for each scene of media. Tags designated at numerals 503 through 509 indicate a data structure of the file header included in the tag designated at numeral 502. The tag designated at numeral 503 indicates the definition of the data structure of the file header and has a structure comprised of a file name 504, an extension of the file name 505, the size of a file 506, a title name of multimedia data 507, a creator of the multimedia data 508, a band 509 necessary to reproduce the multimedia data, time 510 required to reproduce the multimedia data, etc. A tag designated at numeral 511 indicates that object data set for each scene is made up of a header 512 for the object data, and an object body 523. The tag designated at numeral 512 indicates an example illustrative of the definition of the header portion 408 of the object data set for each scene and indicate, in a list form, data structures of reference numerals 513 through 522 contained in the tag designated at numeral 512. The tag designated at numeral 513 indicates a data length of an object set for each scene, which comprises an object header and a body set for each scene, the tag designated at numeral 514 indicates a scene sequence number attached for each scene, the tag designated at numeral 515 indicates the time of the scene, and the tag designated at numeral 516 indicates the time required to reproduce the scene, respectively. The tag designated at numeral 517 indicates ID uniquely attached for each object and has the same ID value in the case of the same object among a series of scenes. The tag designated at numeral 518 is a command with respect to an object, i.e., a command for giving instructions for the creation of an object when the object first appears in the multimedia data, or a command used to indicate the deletion of an object where the scene does not appear subsequently. The tag designated at numeral 519 indicates a band required to reproduce the object of the scene. The tag designated at numeral 520 indicates an encode system or a compression system for an object body where the object is of a video or voice, for example. The tag designated at numeral 521 indicates a type (video, audio, still picture, animation, text data or the like) of media of an object body. The tag designated at numeral 522 indicates an attribute related to the contents of an object such as CM. A tag designated at numeral 523 relates to an attribute of the object body and has attributes related to a position 524 of the beginning of the object body in the multimedia file and a position 525 of the end thereof.

FIG. 6 shows an XML instance in which the correspondence of elements to the file having stored the multimedia data having the data structure of FIG. 4 is performed. A tag designated at numeral 601 is a tag indicating the use of the data structure represented in the XML definition shown in FIG. 5. The tag designated at numeral 602 indicates the beginning of the multimedia data, and tags designated at numerals 603 through 610 respectively indicate information related to the whole multimedia data and are defined by elements contained in a file-head tag. The tag designated at numeral 603 indicates that a file name is movie1.mpg, the tag designated at numeral 604 indicates that an extension of a file is mpg, the tag designated at numeral 605 indicates that a file size of the multimedia data is 2000000 bytes, the tag designated at numeral 606 indicates a title name, the tag designated at numeral 607 indicates a creator of the multimedia data, the tag designated at numeral 608 indicates that 2Mbps is required as a band required to reproduce the multimedia data and is set up as a guide such as a transmission rate required to reproduce data at a location distant from the present sub-system, for example, and the tag designated at numeral 609 indicates that the multimedia data is data of 7200 seconds, respectively. Tags designated at numerals 610 through 634 indicate object bodies of object data set for every scenes. The tag designated at numeral 610 is a tag indicative of the start of the object data, the tag designated at numeral 611 indicates an object data length, and the tag designated at numeral 612 indicates a length obtained by adding an object head length and an object body length together, respectively. Reference numeral 613 indicates a common number applied to the same scenes in common to indicate that the data is of data for the same scene. The tag designated at numeral 614 indicates the start time for the reproduction of each scene. The tag designated at numeral 615 indicates the time required to reproduce a scene contained in the object data. The tag designated at numeral 616 indicates ID common for objects. The common ID is applied to ones that belong to the same object in a series of scenes. The tag designated at numeral 617 is a command indicative of the generation or deletion of an object set for each scene. This indicates timing or opportunity provided to define, update and delete elements for the tag 613 such as an object ID or the like commonly used subsequently to the scene upon object creation. The tag designated at numeral 618 indicates a band necessary to reproduce the object body. Reference numeral 619 indicates an encode format/compression format of the object body. The tag designated at numeral 620 indicates that the type of an object is video, and the tag designated at numeral 621 indicates that the contents is a TV commercial. Reference numeral 622 indicates a tag indicative of start and end positions in the file, of the object body. Reference numerals 623 through 634 respectively indicate audio information that belong to the same scene. The tags designated at numerals 613 and 626 make use of the same sequence number, and the tags designated at numerals 614 and 627 indicate that the data is reproduced at the same time and that the periods necessary for the reproduction of 615 and 628 are the same. Reference numeral 630 indicates a command for an object similarly to 617, and reference numeral 631 indicates that a band necessary for reproduction is 128 kbps. Reference numeral 632 indicates an encode format/compression format of the object body. Reference numeral 633 indicates that data for the object body is audio. Reference numeral 634 indicates the tag indicating a start position and an end position in the file, of the object body.

FIG. 7 shows an example of the definition of a policy XML set to the storage sub-system 101 in relation to a policy about how to store data upon its storage. A tag designated at numeral 701 indicates a document declaration of the XML, and a tag designated at numeral 702 indicates that the policy shown in FIG. 7 is applied to the XML instance of the multimedia data shown in FIG. 6. A tag designated at numeral 703 indicates that object data set for each scene in which a band necessary to reproduce object data set for each scene exceeds a certain threshold value, matches a policy condition. A tag designated at numeral 704 indicates that a storage physical device conditioned by the tag 703, with object data stored therein, is selected and specified from the storage sub-system 101. A tag designated at numeral 706 indicates the determination of a start position in the file of the specified object data, and a tag designated at numeral 707 indicates the determination of an end position in the file of the specified object data, respectively.

FIG. 8 shows an example of a logic structure of a storage sub-system 101. A policy setter designated at numeral 802 stores therein the definition of the data structure of FIG. 5 set to the control memory 112 of the storage sub-system from the management device 116, and the policy XML of FIG. 7 where the policy in which storage physical device the data is stored in correspondence with the data structure of FIG. 5, is defined. Upon accessing the multimedia file of the data structure of FIG. 5, an external device 114 such as a host processor simultaneously applies the data of FIG. 6 generated by applying the defined structure of FIG. 5 to the multimedia file, to the storage sub-system 101 or includes the same in a predetermined portion of the multimedia file. When a request for the storage of multimedia data is made from the external device 114 such as the host processor, a physical device access processor 801 applies the XML instance of the data structure of FIG. 6 to the policy XML of FIG. 7 to thereby judge whether a predetermined storage physical device is selected for each object data set for each scene and the multimedia data is stored therein, or whether the data is stored according to the normal storage system. When the policy is applied and the predetermined physical storage device is selected, the host device such as the host processor operates a logical address-physical address conversion table 803 in which logical addresses used upon accessing to the storage sub-system 101 are associated with a result obtained by specifying storage physical devices in the storage sub-system 101 and physical addresses indicative of which storage locations of the specified storage physical devices data are placed in. Thus, the storage physical devices to be intended for storage can be set and the corresponding data blocks can be located in its corresponding storage physical address.

FIG. 9 shows one example of a configuration of the logical address-physical address conversion table 803 stored in the control memory 112 of the storage sub-system 101. Reference numeral 901 indicates a logical access address from the external device 114 such as the host processor. As a method of performing access from the host processor, a method is considered for obtaining access with parameters such as a file name used by the host processor and an area position accessed from the head of a file by the host processor, the number of bytes for access from the host processor, read/write, etc. In addition to it, there is considered a method of allowing the external device 114 such as the host processor to virtually recognize the storage sub-system 101 as one storage device, logically handling access from the external device to a sector or the like, and performing conversion to access to a storage physical device in the storage sub-system 101. Reference numeral 901 indicates each of logical access addresses from the external device 114 such as the host processor, reference numeral 902 indicates the correspondence of storage physical devices 903 lying inside the storage sub-system 101 with respect to the logical addresses 901 to physical addresses 904 in the storage physical devices. As a result of interpretation of the policy XML shown in FIG. 7, an accessed file name 705, a number 704 of a storage physical device to be intended for storage, a start position 706 of the corresponding object data of the corresponding scene for multimedia data, and an end position 707 thereof are fed back. When a storage physical device is specified based on the evaluation result of the policy XML, the physical device access processor 801 sets the evaluation result of the policy XML to an area for specifying a storage physical device 903 upon storage of the corresponding object data of the corresponding scene for the multimedia data, sets a physical address assigned from a free area of the storage physical device specified by the policy XML evaluation, and stores the multimedia data at its corresponding physical address assigned from the free area of the storage physical device selected by the evaluation point of the policy XML. When a read request from the external device 114 such as the host processor is made to the storage sub-system 101, the processor 101 refers to the logical address-physical address conversion table of FIG. 9 to thereby exchange between a storage physical device 903 having stored objective data set for each scene and a physical address 904 on the storage physical device and to read data from the corresponding physical address on the storage physical device associated with the corresponding physical device, followed by returning of the read data to the external device 114 such as the host processor.

Further, the storage sub-system 101 is connected to a plurality of host devices. The definition of the data structure of FIG. 5 and the policy XML of FIG. 7 are located in the control memory 112 provided within the storage sub-system 101. They may be shared between the plurality of host devices.

A description will next be made of operation in the case where when the policy shown in FIG. 7 is changed, a file stored in the storage sub-system 101 is relocated. The processor 110 lying within the disk controller 109 is placed under instructions so as to relocate a file related to the policy of FIG. 7 or a predetermined file after the policy shown in FIG. 7 has been changed. When the storage sub-system 101 applies the changed policy XML of FIG. 7 to the XML file of FIG. 6 described based on the definition of the data structure of FIG. 5 for a file to be relocated to thereby evaluate the file intended for relocation, the numbers of storage physical devices to be stored for each object in respective scenes for multimedia data, and start and end positions of the objects in the file are returned. Based on the returned start and end positions, the processor 110 retrieves the table of FIG. 9 descriptive of the correspondence between the logical addresses and the physical addresses to acquire the number of the storage physical device in which the corresponding data blocks are located. When the storage physical device is different from a storage physical device to store the corresponding object obtained by the application of the changed policy XML of FIG. 7, the processor 110 assigns a necessary area from a free data block of a storage physical device used as a new storage destination and reads data from the currently-located data block, followed by copying on the corresponding data block of the storage physical device corresponding to the assigned new storage destination. Further, the items of the data blocks for the storage physical device, which are contained in the logical address-physical storage address conversion table shown in FIG. 9, are changed to their corresponding newly-stored storage physical device number and physical address. Next, the data block used for storing data in the original storage physical device is changed to a free data block.

On the other hand, when a request for data storage is made, the storage sub-system 101 applies the policy XML shown in FIG. 7 to the file having the data structure of FIG. 6. As a result, a free space of a storage physical device instructed so as to store a given object might be smaller than a space required to store an object obtained from start and end positions of an object obtained by evaluating the policy XML. At this time, the processor retrieves the logical address-physical storage address conversion table shown in FIG. 9 to find a data block using the same storage physical device as the storage physical device instructed so as to store the object. Further, the processor assigns a necessary area to the found data block from a free data block of a given storage physical device in another free or empty region and reads data form the found data block, followed by copying on a data block of a storage physical device corresponding to a newly-assigned storage destination. Further, the processor changes the items of the storage physical device for the copied data block included in the logical address-physical storage address conversion table shown in FIG. 9 to newly-stored storage physical device numbers and physical addresses, and changes the data block corresponding to the copy source of the storage physical device instructed so as to store the object to a free data block. This operation is repeated until a free space of the storage physical device instructed so as to store the object is sufficiently obtained. After the free space has been ensured by its repetition, the object is stored in its corresponding storage physical device obtained as a result of the application of the policy XML shown in FIG. 7.

In the storage sub-system, the processor 110 applies the policy XML shown in FIG. 7 on a regular basis according to the program stored in the control memory 112. As a result, when an instruction is given so that an object is stored in its corresponding storage physical device, the processor examines a free space of the storage physical device to thereby check whether it exceeds a threshold value of a predetermined free space. The above checking may be carried out periodically where the load of the processor 110 is low. When it is found to have exceeded the threshold value, the processor 110 issues a warning to the management device 116 or the like and notifies to a supervisor that the free space gets less. At this time, the processor may issue notification with being added with information such as a file name corresponding to the source for selecting the corresponding storage physical device, the policy XML of FIG. 7, etc.

Figure 10:
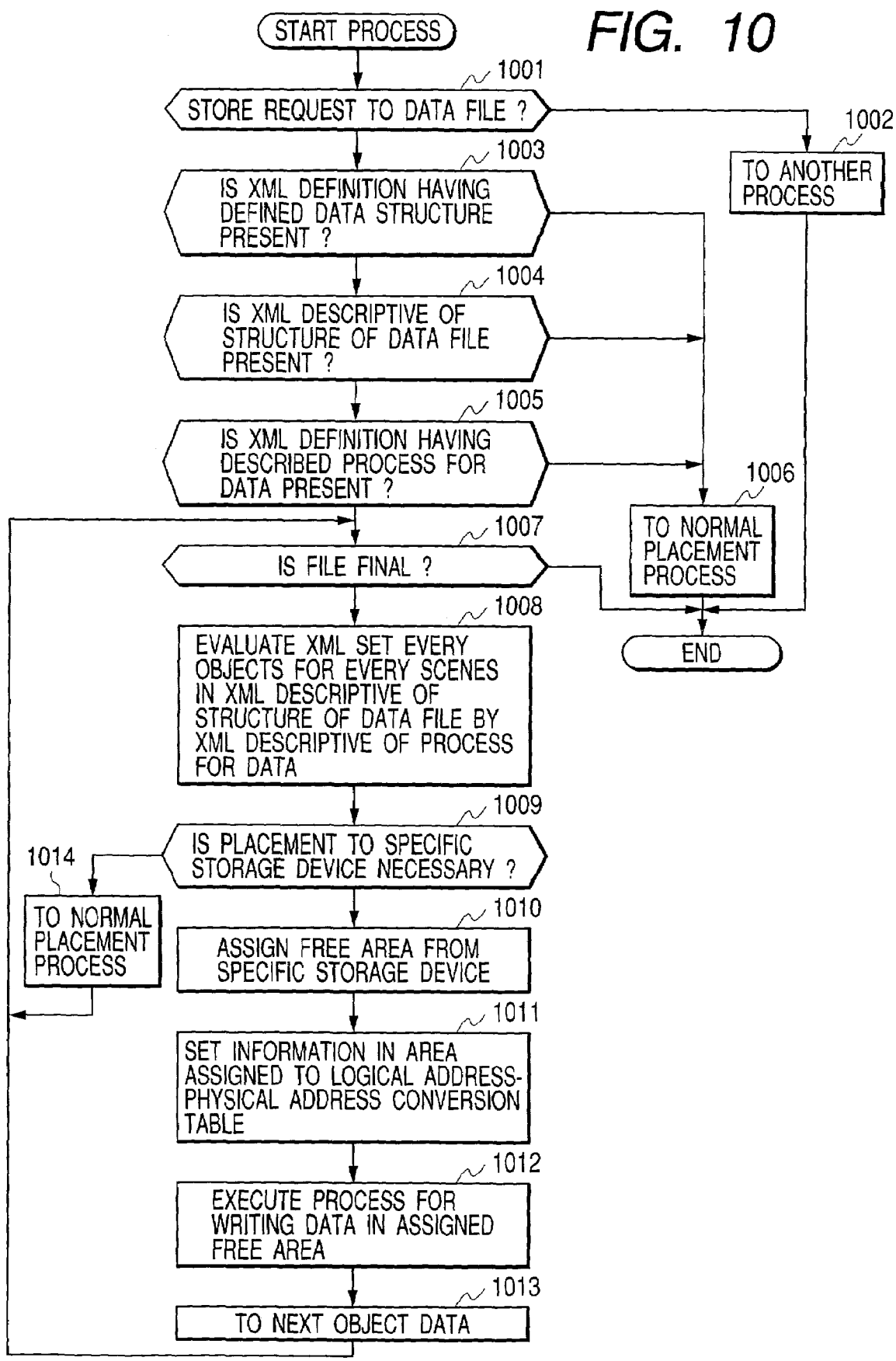
FIG. 10 is a flowchart for describing a process at the time of placement of data blocks of a storage sub-system to which the present invention is applied.

FIG. 10 shows the operation of the storage sub-system 101 where a request for the storage of a file having such a data structure as shown in FIG. 6 is made to the storage sub-system of the present invention from the host device such as the host processor. In a process step 1001, the storage sub-system 101 determines whether the file storage request has been made. If it is determined that no storage request has been made, then the storage sub-system 101 executes another process 1002. Next, the storage sub-system 101 retrieves whether the XML file of FIG. 5 having defined the data structure contained in the file subjected to the storage request exists on the control memory 112 (Step 1003). If it is found not to exist, then the storage sub-system 101 executes a normal placement process 1006. Next, the storage sub-system 101 retrieves whether the XML file of FIG. 6 described based on the definition of the data structure of FIG. 5 with respect to the file subjected to the storage request exists on the control memory 112 or it exists in a predetermined position of the file subjected to the storage request (Step 1004). If it is found not to exist, then the storage sub-system 101 executes the normal storage process 1006. The storage sub-system 101 retrieves whether the XML of FIG. 7 having described a process in which storage physical device is placed with respect to the file placed under the definition of the data structure of FIG. 5, exists on the control memory 112 (step 1005). If it is found not to exist, then the storage sub-system executes the normal placement process 1006. The storage sub-system 101 makes a decision as to the end of the file subjected to the storage request in a process step 1007. If the end of the file is reached, then the storage process is terminated. The storage sub-system 101 applies an XML having described a process for the data of FIG. 7 for each object of each scene from within the XML descriptive of the data structure of the data file of FIG. 6 and evaluates it (Step 1008). As a result, when a decision is made as storing to a specific storage physical device (Step 1009), the storage sub-system 101 calculates the size of an object set for each scene of 634 from start and end positions of the object within a data file having attributes for an object body contained in the object, and assigns a necessary storage area from a free area of the selected storage physical device (Step 1010). When no storage physical device is selected, the storage sub-system 101 executes a normal placement process 1014. When the selected storage physical device has no free space, the storage sub-system 101 notifies the fact that no free space is provided for the selected storage physical device, or the applied policy to the management device 116. When no free space is provided, the storage sub-system executes the normal placement process 1014 or shifts the area already assigned to the selected storage physical device to another storage physical device to thereby ensure the corresponding area. Next, the storage sub-system sets information about an area assigned to the table for converting the logical addresses used to access to the storage sub-system 101 in FIG. 9 to their physical addresses for the storage physical devices lying within the storage sub-system, which are associated with the storage physical devices, to the assigned areas (Step 1011). Next, the storage sub-system 101 writes data of the object into the area assigned for the storage physical device (Step 1012) and makes preparations for execution of a process for the next object (Step 1013).

According to the storage system of the present invention, an advantageous effect can be obtained in that a data block high in access frequency within the storage system can be placed in its corresponding storage physical device fast in access rate, and the storage physical device fast in access rate can be used with satisfactory efficiency. It is also possible to enhance an average access rate for data placed within the storage system.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A storage system comprising:
    at least one communication port configured to be coupled to a network;
    a plurality of storage devices being different in access rate; and
    a controller in data communication between the storage devices and the at least one communication port,
    wherein the at least one communication port receives from a computer connected to the network a request for storing file data having a data structure comprising a plurality of data blocks,
    wherein the controller sets a policy according to a data structure of the file data to determine in which storage devices the data blocks are to be placed,
    wherein the controller is operable to assign the data blocks of the file data to the storage devices by collating the policy when the controller receives the file data associated with the request for storing via the communication port,
    wherein the data blocks are stored in the storage devices as determined by the policy.

2. The storage system of claim 1, further comprising a memory controller, wherein the file data comprises a first data block and a second data block, wherein the memory is configured with information indicative of one or more storage devices on which the first data block is to be stored and on which the second data block is to be stored, wherein the controller is operable to store the first data block on a first of the one or more storage devices and to store the second data block on a second of the one or more storage devices according to the information.

3. The storage system of claim 1, further comprising a memory controller, wherein the memory is configured with information that associates one or more storage devices with a data structure and with the port over which data is received, wherein the controller identifies a destination storage device for a received data block based at least on a data structure of the received data block and the port over which the received data block was received.

4. The storage system of claim 1, wherein a first storage device is designated to store data blocks of a first data structure, wherein the controller stores a received data block having the first data structure in the first storage device.

5. The storage system of claim 1, wherein the data structure is defined using XML (extended markup language) and includes a header tag indicative of a start position of a file and an end position of the file, and at least one data block tag indicative of one or more data blocks located between the header tag and the end tag comprising the file.

6. The storage system of claim 5, wherein each data block tag is associated with a storage device, wherein the controller is operative to store data blocks indicated by a first data block tag onto a storage device associated with the first data block tag, wherein the controller is operative to store data blocks indicated by a second data block tag onto a storage device associated with the second data block tag.

7. The storage system of claim 5, wherein the controller is operative to select a predetermined data block based on the data block tag.

8. The storage system of claim 7, wherein each data block tag is associated with a storage device, wherein the controller is operative to store data blocks indicated by a first data block tag onto a storage device associated with the first data block tag, wherein the controller is operative to store data blocks indicated by a second data block tag onto a storage device associated with the second data block tag.

9. The storage system of claim 1, wherein one of the data blocks comprises image data.

10. The storage system of claim 1, wherein one of the data blocks comprises synchronous data to reproduce data in a synchronous manner.

11. The storage system of claim 1, wherein one of the data blocks comprises an object data of multimedia data.

12. The storage system of claim 1, wherein the controller is operable to assign the data blocks of the file to two or more of the storage devices.

13. A storage method for storing file data into a plurality of storage devices comprising:
    providing a plurality of storage devices, each being different in access rate, to store a different data block therein according to an attribute of the file data having a data structure comprising a plurality of data blocks;
    setting previously a policy according to the data structure of the file data to determine in which storage devices that data blocks are to be placed;
    receiving from a computer a request for storing file data having the data structure having the data blocks;
    assigning the data blocks of the file data to the storage devices by collating the policy; and
    storing the data block into the different storage devices assigned by the policy.

14. The storage method of claim 13, wherein the data structure is defined using XML (extended markup language) and includes a header tag indicative of a start position of a file and an end position of the file, and at least one data block tag indicative of one or more data blocks located between the header tag and the end tag comprising the file.

15. The storage method of claim 13, wherein the data blocks comprises multimedia data including data encoded for every object set and for every scene, wherein an object which is accessed by a large number of users is assigned to one or more high access speed storage devices.

* * * * *